United States Patent Office 3,453,079
Patented July 1, 1969

3,453,079
PROCESS FOR PREPARING COMPOUNDS CONTAINING SILICON AND FLUORINE
Horst G. Langer, Cochituate, Mass., assignor to The Dow Chemical Company, Midland, Mich., a corporation of Delaware
No Drawing. Filed June 5, 1964, Ser. No. 373,077
Int. Cl. C01b 33/10
U.S. Cl. 23—203          5 Claims

ABSTRACT OF THE DISCLOSURE

The present invention consists of a process for preparing silicon-fluorine-containing compounds, which are useful as intermediates in chemical synthesis, which comprises providing a mixture of an inorganic metal fluoride-containing compound, such as calcium fluoride ($CaF_2$), and an inorganic silicon-containing compound, such as silicon dioxide ($SiO_2$), reacting said mixture under controlled conditions, and recovering said silicon-fluorine-containing products from the reaction mass.

---

A principal object of the present invention is to provide a novel process for preparing silicon-fluorine-containing compounds which ordinarily are difficult to obtain. A further object is to provide a process wherein useful, but many times hard to prepare, silicon-fluorine-containing compounds are prepared using calcium fluoride as a raw material.

Other objects and advantages will become apparent from the detailed description of the invention which follows.

Accordingly, the novel process of the present invention for preparing silicon-fluorine-containing compounds comprises in general the steps of: providing a reaction mixture of an inorganic metal fluoride-containing salt or compound, such as, for example, calcium fluoride ($CaF_2$), and an inorganic silicon-containing compound as a scavenging agent, such as, for example, silicon dioxide, which is reactive with the fluorine component of the aforesaid fluorine salt; reacting said mixture in an inert atmosphere, such as argon or nitrogen, at a reaction temperature sufficient to melt the reactants and cause an exchange reaction but below the boiling point of the reaction mass, thereby to form a gaseous mixed product in substantially quantitative yields comprising various useful silicon-fluorine-containing compounds, which may then be collected and recovered by means commonly employed by those skilled in the art. These latter operations may be carried out by condensing the gaseous product in, for example, a low temperature receiver.

The various silicon-fluorine-containing compounds which may be prepared by the present process comprise, for example, siliconoxyfluoride ($SiOF_2$), hexafluorodisiloxane ($(SiF_3)_2O$), hexafluorodisilthiane difluoride ($F_3Si$—$SF_2$—$SiF_3$), and bis(trifluorosiloxy) sulfurdifluoride ($F_3Si$—O—$SF_2$—O—$SiF_3$).

The aforenamed compounds are highly useful in general as intermediates in chemical synthesis work. More specifically, the compound siliconoxyfluoride, for example, is useful as a fumigant or fluorinating agent. The compounds trifluorosiloxane, bistrifluorosilylsulfurdifluoride and bistrifluorosilylsulfone are used as polymeric intermediates.

In the present process, the reaction ordinarily is carried out at a temperature of from about 2000° C. to about 3000° C. Optimally, a temperature of from about 2000° C. to about 2500° C. is employed, for example, when reacting calcium fluoride and silicon dioxide, the preferred reactants. Such a reaction temperature may be obtained by use of an electric arc furnace even though application of an electric potential through the mix is unnecessary in carrying out the present invention. Other sources of heat may also be employed. Reaction in the arc furnace, however, is most convenient and preferred.

In actual operation using such a furnace, the reaction mixture is placed in a carbon crucible as an anode, and an arc established therewith by contacting the crucible and contents with a carbon cathode rod, thereby to melt the mixture. Normally, a low potential such as, for example, 5–10 volts at 50–100 amperes, is first applied from about 15 to 30 minutes to accomplish said melting, whereupon the rod is drawn slightly so as to provide a gap between the melt and rod and then the maximum operating potential applied such as, for example, a potential of about 20 to 40 volts at about 150 to 200 amperes.

The gaseous silicon-fluorine-containing compounds prepared by the present novel process can, as aforesaid, be recovered by condensation. A series of cooled receivers or traps may be employed, for example, comprising an air cooled column and container as a first trap, wherein dust and unreacted materials blown over from the reactor are caught, a second trap comprising a water-cooled column to precool said gaseous product, a Dry Ice-acetone-cooled column and reservoir as a third step wherein the high boiling product compounds are condensed and recovered, and a fourth trap or condenser where the lower boiling product compounds condense and are recovered. The condensed product compounds so-recovered may either be placed in suitable pressure vessels at normal temperature or in vessels at atmospheric pressure with cooling. So condensed, the condensate may, if desired, be conventionally fractionally distilled to singly obtain the separate useful silicon-fluorine-containing compounds therefrom.

The inorganic fluorine-containing salt and silicon-containing scavenging agent are ordinarily reacted in molar proportions such to provide a silicon-to-fluorine ratio of about 1 to 2. Though an excess of the fluorine-containing salt as well as of the scavenging agent may be used, substantially stoichiometric proportions, as above, are preferred since such excesses merely serve to unnecessarily increase the boiling point of the reaction mixture.

The inorganic fluorine-containing salts suitable for use in the present invention include both simple and complex fluorides, the metal component of said simple fluorides being a member of Group I–A and II–A of the Mendeleeff arrangement of the elements. Examples of suitable fluoride salts are calcium fluoride ($CaF_2$), cryolite ($Na_3AlF_6$), fluoroapatite ($Ca_{10}(PO_4)_6F_2$), sodium fluorosilicate ($Na_2SiF_6$), sodium fluoride (NaF), potassium fluoride (KF), and sodium fluoroaluminate ($Na_3AlF_6$), and the like.

The inorganic scavenging agents suitable for use in the present invention are materials which are reactive with the fluorine component of the inorganic fluorine salts aforesaid. Examples of typical scavenging agents are silicon dioxide; silicates, e.g. sodium silicate ($Na_2SiO_3$); silicoaluminates; and similar sources of mineral silicon.

Atoms of other elements than silicon and fluorine which may appear in the compounds prepared by the method of the present invention derive from their presence in either of the reactants or, for example, in the case of carbon atoms, from reaction with the arc furnace anode or cathode. Moreover, carbon may specifically be added to the reaction mixture if a carbide residue byproduct is desired.

In carrying out the process of the present invention in its preferred form to obtain the useful silicon-fluorine product compounds aforesaid, fluorspar ore is pulverized to a particle size such that about 95 percent thereof will pass a number 80 to a number 100 mesh screen (U.S. Standard Sieve Series). This is admixed with silicon dioxide in a molar ratio of 2 moles of fluorine to 1 mole of silicon, whereupon, the mixture is introduced into a carbon or other suitable refractory crucible of an electric arc furnace equipped with a hood means connected to a series of cold traps, as hereinbefore described, for collecting and recovering the evolved gases. A carbon electrode is then immersed so as to be in contact with the crucible and mixture therein. Thereafter, said mixture is heated to the melting and reaction temperature specified hereinbefore in an argon atmosphere. By so-doing, the reaction mass melts and evolves a mixed gas consisting of various compounds containing silicon and fluorine, which are collected and recovered by the means aforesaid.

Means may also be provided to continuously feed a supply of the aforesaid reaction mixture to, for example, the crucible while the compounds are being formed and collected, thus rendering the present novel process applicable not only to batch and cyclic batch operating, but also to continuous operations.

The present process by which the aforesaid and other useful silicon-fluorine compounds are prepared has the advantage of being relatively simple, uses common and inexpensive raw materials, obtains for the most part useful by-products, and does not require the use of particularly special equipment or conditions.

The following example serves to more fully illustrate the present invention, but is not intended to limit the invention thereto.

Example

About 36 grams of $SiO_2$ together with about 78 grams of $CaF_2$ and about 48 grams of carbon (lampblack) were placed in a graphite carbon crucible, also serving as an anode, and an electric arc established with the contents and crucible by means of a carbon rod, to melt and heat decompose said contents. A reactive temperature range of from about 2000° C. to about 2500° C. was thus obtained using a maximum electrical input energy level in the arc furnace during approximately a 3 hour reactor period of about 20 volts at about 150 amperes. Initially the reactants were heated by contacting the carbon rod with said reactants at a low potential and current, then increasing the potential to the aforesaid maximum. During the reaction argon was passed through the furnace as an inert gas carrying or sweep gas as a means to convey the gaseous reaction product which was formed.

The so-formed gaseous product in the argon conveyance was then passed through a series of traps for recovery purposes comprising a first trap comprising a columned air chamber, a water-cooled column and container as a second trap, a third trap consisting essentially of a Dry Ice-acetone-cooled column and reservoir, and a final trap consisting substantially of a column and flask cooled by liquid nitrogen.

In traversing said trap series, dust comprising a portion of the reactants blown over from the furnace was collected in the air chamber, with the water-cooled column and container being used to preliminarily cool the gaseous reaction product, while relatively high boiling silicon-fluorine containing compounds were recovered in the Dry Ice-acetone trap, and lower boiling silicon-fluorine liquids and solids in the nitrogen trap.

Each portion of the product recovered in the various traps, as well as the solid products condensed on the walls of the furnace, and the residue left in the crucible, were analyzed by use of a Bendix Timeflight Mass Spectrometer: siliconoxyfluoride, hexafluorodisiloxane, hexafluorodisilthiane difluoride, and bis(trifluorosiloxy) sulfurdifluoride, including certain fragmentary compositions were identified. Similar analysis showed the residue as consisting essentially of calcium carbide, a useful by-product, and some unreacted $CaF_2$, silicon metal, silicon carbide, and some calcium silicate.

This mixed product so-produced may then be distilled by conventional means to singly obtain the individual useful fluorine-silicon-containing components therefrom.

The above described process was carried on to the point where about 40 percent of the original amount of available fluorine was converted to the compounds hereinbefore described. It is understood, of course, that essentially a 100 percent conversion could readily be obtained by extending the reaction period so as to completely consume the reactants and convert all the fluorine and silicon values in the melt to the silicon-fluorine-containing product.

In view of the nature of the present invention, it is manifest that the process thereof may be modified or changed without departing from the spirit or scope thereof and it is understood that I limit myself only as defined in the appended claims.

I claim:

1. A method of preparing silicon-fluorine-containing compounds selected from the group consisting of silicon-oxyfluoride and hexafluorodisiloxane which comprises: providing a reaction mixture of an inorganic metal fluorine-containing salt selected from the group consisting of calcium fluoride, fluoroapatite, sodium fluorosilicate, sodium fluoride, potassium fluoride, and sodium fluoroaluminate and an inorganic silicon-containing scavenging agent selected from the group consisting of silicon dioxide, silicates, and silicoaluminates which is reactive with the fluorine component of the fluorine-containing salt; reacting said mixture in an inert gaseous atmosphere and at a minimum temperature sufficient to melt the reactants but below the boiling point of the reaction mass, thereby to form a gaseous product having the silicon-fluorine-containing compounds therein; and recovering the gaseous product so-formed.

2. The method of claim 1 wherein the inorganic metal fluorine-containing salt and the scavenging agent are reacted in substantially stoichiometric mole proportions.

3. The method of claim 1 wherein the reaction mixture is reacted at a temperature of from about 2000° C. to about 3000° C.

4. The method of claim 1 wherein the silicon-fluorine-containing compounds are recovered by condensation.

5. A method of preparing silicon-fluorine-containing compounds selected from the group consisting of silicon-oxyfluoride and hexafluorodisiloxane which comprises: providing a reaction mixture of calcium fluoride and silicon dioxide, said reactants being present in the reaction mixture such to provide a silicon-to-fluorine mole ratio of at least 1 to 2; reacting said mixture in an inert atmosphere, and at a reaction temperature of from about 2000° C. to about 3000° C., thereby to evolve a mixed gaseous reaction product of the silicon-fluorine-containing compounds, condensing said mixed product to form a condensate, and recovering the silicon-fluorine compounds individually from said condensate so-formed by fractional distillation.

References Cited

UNITED STATES PATENTS 3,132,925   5/1964   Pacini et al. _____ 23—203

OSCAR R. VERTIZ, *Primary Examiner.*

HOKE S. MILLER, *Assistant Examiner.*

U.S. Cl. X.R.

23—205, 367